May 13, 1969 W. N. JONES 3,444,399
TEMPERATURE CONTROLLED ELECTRONIC DEVICES
Filed Sept. 24, 1965

WITNESSES:
John L. Chopp
Donald M. Winegar

INVENTOR
Wesley N. Jones
BY
C. L. Menzemer
ATTORNEY

United States Patent Office 3,444,399
Patented May 13, 1969

3,444,399
TEMPERATURE CONTROLLED
ELECTRONIC DEVICES
Wesley N. Jones, Severna Park, Md., assignor to Westinghouse Electric Corporation, Pittsburgh, Pa., a corporation of Pennsylvania
Filed Sept. 24, 1965, Ser. No. 489,953
Int. Cl. H01h 37/32
U.S. Cl. 307—310                 11 Claims

ABSTRACT OF THE DISCLOSURE

Positive Temperature Coefficient (PTC) thermistors are utilized to create an artificial environment for an electronic device to operate within. Cup-shaped PTC thermistor members are joined together to form environmental chambers in which electronic devices operate in an artificial environment created by the members. A Negative Temperature Coefficient (NTC) thermistor is used with two PTC thermistors to form a switch. Additionally, an NTC thermistor controls the resistance of a first PTC thermistor in close thermal transfer relationship with a second PTC thermistor, the variation of the resistance of the first PTC thermistor regulating the current flow through an electrical load in a series circuit relationship with the first PTC thermistor.

---

This invention relates to a method for stabilizing the variations in the ambient temperature, voltage and amperage of electronic devices and electrical circuitry.

A fundamental problem in semiconductor circuit design is the parameter variations with temperature. Such variations can cause a fluctuation in the reverse collector-base leakage current in a semiconductor device and result in distortion and a loss of efficiency and stability. Therefore, it is often necessary to create an artificial environment in which electrical circuitry, particularly semiconductor circuitry, may operate in a stabilized and an efficient manner.

It is an object of this invention to provide a means of stabilizing the temperature variations of electronic devices.

Another object of this invention is to provide a method of stabilizing the temperature variations of an electronic device utilizing one, or more, Positive Temperature Coefficient (PTC) thermistors.

It is another object of this invention to provide a means for minimizing the fluctuations in electrical circuitry voltage and amperage resulting from power supply variations.

Other objects of the invention will, in part, be obvious, and will, in part, appear hereinafter.

For a better understanding of the nature and objects of the present invention reference should be had to the following detailed description and drawings, in which.

In accordance with the present invention and the attainment of the foregoing objects, there is provided a temperature controlled electronic device.

The device comprises a body of semiconductor material retained in a close thermal energy transfer relationship with a body of Positive Temperature Coefficient thermistor material. The body of semiconductor material has at least two regions of opposite type semiconductivity and at least one p-n junction contained therein. A jacket of suitable insulating material encapsulates the bodies of semiconductor material and Positive Temperature Coefficient material.

A Positive Temperature Coefficient (PTC) thermistor is a temperature-sensitive semiconductor device which exhibits a sharp positive increase in electrical resistance for a small increase in the temperature of the Positive Temperature Coefficient (PTC) thermistor body over a specified operating temperature range. This rapid change in temperature sensitivity occurs at a transition temperature which is determined by the inherent physical characteristics of the material used in making the PTC thermistor.

Positive Temperature Coefficient thermistors are capable of being manufactured in many different shapes such as cubes, tubes, hemispheres, cylinders and the like. The adaptability to a variety of shapes makes it very feasible to manufacture any desired modification of a temperature controlled semiconductor device embodying the teachings of this invention.

Since the Positive Temperature Coefficient thermistor has unique temperature sensitivity characteristics and the ability to be manufactured in many different physical forms, several unique electrical circuit applications are possible.

One or more Positive Temperature Coefficient thermistors may be placed in a close thermal relationship with an electrical or an electronic device in order to produce an artificial operating environment for the device.

Two Positive Temperature Coefficient thermistors and a Negative Temperature Coefficient (NTC) thermistor may be employed to make an attenuator device.

A Positive Temperature Coefficient thermistor may be used directly in an electrical circuit, to compensate for normal input voltage variation and to provide a constant flow of an electrical current through a circuit load.

Figure 1:
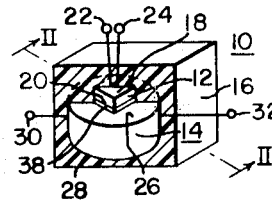
FIGURE 1 is a perspective view, partially in cross-section, of a temperature controlled electronic device made in accordance with the teachings of this invention.
Figure 2:
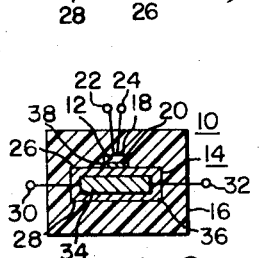
FIG. 2 is a cross-sectional view of the temperature controlled electronic device in FIG. 1 taken on line II—II.

With reference to FIGS. 1 and 2, there is shown a temperature controlled electronic device 10 made in accordance with the teachings of this invention. The device 10 comprises an electronic component 12 in a close thermal energy transfer relationship with a Positive Temperature Coefficient (PTC) thermistor 14, both of which are encapsulated within a jacket 16 of insulating material. The component 12 has a top surface 18, and a bottom surface 20 and electrical leads 22 and 24. The thermistor 14 has a top surface 26, a bottom surface 28 and electrical leads 30 and 32.

The component 12 may such, for example, be either a diode, a transistor, a controlled rectifier, a Positive Temperature Coefficient (PTC) thermistor, a negative temperature coefficient thermistor (NTC) or a complete microelectronic circuit. Within the component 12 there may be at least one junction between different types of semiconductor material whose temperature variance is to be controlled by the body 14 of PTC thermistor material.

The thermistor 14 may be one that is obtainable commercially. Like many commercially available PTC thermistors, the thermistor 14 comprises a body 34 of PTC thermistor material and a coating 36 of protective material.

The expected operating temperature range in which the device 10 must operate determines the PTC thermistor 14 which is required. The physical characteristics must show a sharp positive increase in electrical resistance for a small increase in the temperature of the thermistor 16 over a specified operating temperature range. Published data on the physical characteristics of commercially available PTC thermistors is available from the manufacturers. The PTC thermistor 14 selected is one whose sharp positive increase in electrical resistance occurs at a temperature range higher than the expected operating temperature range for the device 10.

The required close thermal energy transfer relationship between the component 12 and the thermistor 14 is achieved by disposing a layer 38 of suitable bonding material between the bottom surface 20 of the component 12 and the top surface 26 of the thermistor 14. The bonding material may be, for example, either an electrically nonconducting epoxy resin without a filler material, or an electrically insulating varnish, such as diphenyl oxide polymers, which are commercially available and are the same diphenyl oxide polymers described and claimed in a copending patent application, Ser. No. 193,943, filed on May 11, 1962.

Electrical solder materials, such, for example, lead-tin alloys, may also be employed as the bonding material in the layer 38. Electrical current through the layer 38 between the component 12 and the thermistor 14 does not cause any significant detrimental affects in stabilizing the junction temperature of the component 12. It is important, however, that the material comprising the layer 38 have a thermal resistance much less than the thermal resistance of the surrounding ambient of the device 10.

The jacket 16 encapsulates both the component 12 and the thermistor 14 in order to minimize the loss of the self-generated heat from the thermistor 14 to the surrounding ambient. The jacket 16 enables the device 10 to operate more efficiently thereby providing a more stabilized junction temperature in the component 12. Examples of suitable insulating materials for the jacket 16 are polyurethane foam, still air, vermiculite, glass wool and various foamed epoxies.

The electrical leads 22 and 24 of the component 12 and the electrical leads 30 and 32 of the transistor 14 are all brought out through the jacket 16 for connecting into their respective electrical circuits.

A predetermined voltage is impressed across the leads 30 and 32. The resulting electrical current flowing through the internal resistance of the thermistor 14 generates heat. This generated heat causes the temperature of the thermistor 14 to increase until stabilized at a temperature directly related to the impressed voltage and the electrical resistance of the thermistor 14. The temperature of the junction, or junctions, of the component 12 will be stabilized at, and remain the same as, the temperature of the thermistor 14 because of the close thermal energy transfer relationship between them.

Should a change occur in the ambient temperature from either the power dissipated by the component 12 or from the surrounding environment, the change in temperature is sensed, and compensated for, in a direction opposite to the temperature change, by the thermistor 14. Therefore a rise in the ambient temperature will cause the resistance of the thermistor 14 to increase proportionally to its inherent physical characteristics. Since the impressed voltage across the leads 30 and 32 remains constant, the electrical current must decrease. With the decrease in current the heat dissipated by the thermistor 14 becomes less and the junction temperature within the component 12 is still essentially the original established operating temperature.

Variations of up to 10% in supply line voltage to an electrical circuit incorporating a Positive Temperature Coefficient thermistor employed to stabilize the junction temperature of an electronic component, and embodying the teachings of this invention, have little effect upon the desired operating temperature of the temperature controlled electronic device. Normal variations in the power dissipation of the electronic component whose junction temperature is being stabilized also has little effect upon the normal operation of a temperature controlled electronic device.

Two or more Positive Temperature Coefficient thermistors may be required in the fabrication of a controlled temperature electronic device. This is particularly true where the temperature variance of the expected operating temperature range is very large or in instances where the temperature variance of the artificial environment is to be maintained as small as possible.

Figure 3:
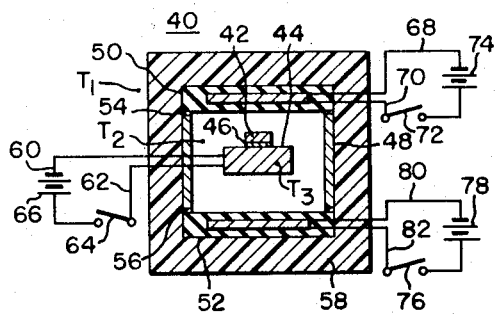
FIG. 3 is a cross-sectional view of a temperature controlled semiconductor device made in accordance with the teachings of this invention.

With reference to FIG. 3, there is shown an excellent controlled temperature electronic device 40. The device 40 comprises a semiconductor component 42 such, for example, a semiconductor diode, being retained in a close thermal energy transfer relationship with a first Positive Temperature Coefficient thermistor 44 by a layer 46 of suitable bonding material disposed between them. Either conducting or nonconducting bonding may be used by employing an appropriate arrangement of the external circuitry.

The component 42 and the thermistor 44 are centrally disposed within a chamber comprising a hollow spacer 48, or a length of tubing, a second Positive Temperature Coefficient thermistor 50 and a third Positive Temperature Coefficient thermistor 52. The thermistor 50 is joined to one end of the spacer 48 by a layer 54 of suitable bonding material. The thermistor 52 is joined to the opposite end of the spacer 48 by a layer 56 of suitable bonding material. The bonding material of the layers 54 and 56 are similar to, and usually are the same as, the material used in the layer 46.

A jacket 58 of insulating material encapsulates the details of the device 40 for example. The jacket 58 is made of polyurethane foam, still air, vermiculite, foamed epoxies or glass wool.

The spacer 48 may be a good thermally conductive material selected from a group consisting of copper, aluminum, alloys of copper and auminum, glass or Positive Temperature Coefficient thermistor material.

Electrical leads 60 and 62 from the thermistor 44 pass through the chamber enclosure and the jacket 58 and are attached to a first electrical switch 64 and a first source 66 of electrical power completing an electrical circuit. The thermistor 50, by means of electrical leads 68 and 70 passing through the jacket 58, is in an electrical series circuit relationship with a second electrical switch 72 and a second electrical power source 74. A third electrical switch 76 and a third electrical power source 78 is in electrical series circuit relationship with the thermistor 52, by means of electrical leads 80 and 82 which also pass through the jacket 58.

The power sources 66, 74 and 78 supply a constant predetermined voltage to their respective electrical series circuits. The switches 64, 72 and 76 are closed and the PTC thermistors 44, 50 and 52 are allowed to become stabilized resulting in constant temperature readings for $T_2$ and $T_3$ so long as the temperature at $T_1$ remains constant. The power sources 66, 74 and 78 may be a single source controlled by a single switch.

The device 40 is excellent for purposes where microelectronic circuitry distortion and efficiencies are of a critical nature.

Figure 4:
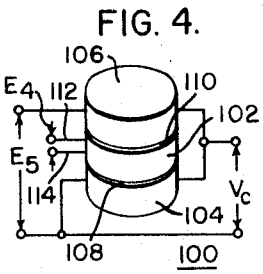
FIG. 4 is a perspective view of a semiconductor device connected in a circuit so as to function as a variable voltage attenuator.
Figure 5:
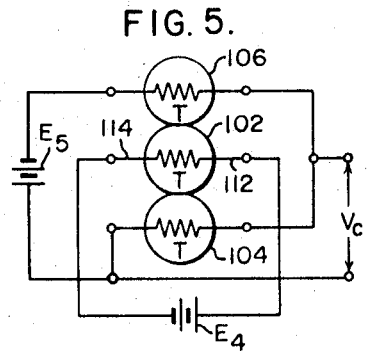
FIG. 5 is an electrical schematic diagram for the variable voltage attenuator shown in FIG. 4.

With reference to FIG. 4 there is shown a variable voltage controlled attenuator 100 comprising a first, or controlling, Positive Temperature Coefficient (PTC) thermistor 102 disposed between, and maintained in a close thermal energy transfer relationship with a second PTC thermistor 104 and a Negative Temperature Coefficient thermistor 106 by layers 108 and 110 of suitable bonding material. With reference to FIG. 5 there is shown an electrical schematic diagram of the variable voltage controlled attenuator 100.

The bonding material of the layers 108 and 110 is an electrically insulating varnish, such as diphenyl oxide polymers or an electrically non-conducting epoxy, without any filler material contained therein. The bonding material must have a thermal resistance much less than the thermal resistance of the surrounding ambient of the attenuator 100.

A Negative Temperature Coefficient (NTC) thermistor is a temperature-sensitive, semiconductor device which exhibits a sharp negative increase in electrical resistance for a small increase in the temperature of the NTC thermistor body over a specified operating temperature range.

When a constant predetermined voltage $E_4$ is impressed across the leads 112 and 114 of the thermistor 102, the electrical resistance of the thermistor 102 creates internal heating thereby increasing the temperature of the thermistor 102 to a predetermined operating temperature range. The thermistors 104 and 106, being in a close thermal energy transfer relationship with the thermistor 102, are both stabilized at the operating temperature of the thermistor 102.

Variations in the ambient temperature about the variable voltage controlled attenuator 100 or in the power dissipated in the attenuator thermistors 104 and 106 have only a secondary effect on a controlled output voltage $V_c$. When an impressed voltage $E_5$ is held constant, variations in the impressed voltage $E_4$ will vary the temperature of the thermistor 102 accordingly. This temperature variation of the thermistor 102 will thus vary the temperature of both thermistors 104 and 106. These temperature variations in the thermistors 104 and 106 will cause corresponding changes in the resistance of each of the thermistors 104 and 106 respectively and will therefore produce a corresponding variation in the output voltage $V_c$. Therefore, one can easily adjust the input voltage $E_4$ to the controlling thermistor 102 to achieve the desired controlled output voltage $V_c$ while the voltage $E_5$ remains unchanged.

The thermistors 102, 104 and 106 may also be maintained in a close thermal energy transfer relationship by mechanical means only. The mechanical means may include springs or encapsulating the whole attenuator 100 in a manner that will retain the thermistors 102, 104 and 106 under compressional forces.

Figure 6:
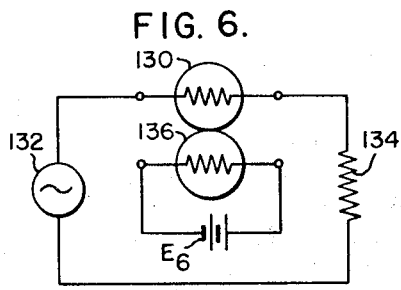
FIG. 6 is an electrical schematic diagram of a temperature controlled Positive Temperature Coefficient thermistor in an electrical circuit.

With reference to FIG. 6 there is shown a circuit diagram of a first Positive Temperature Coefficient (PTC) thermistor 130 electrically in a series circuit relationship with a power source 132 and an electrical load 134. The thermistor 130 is in a close thermal energy transfer relationship with a second Positive Temperature Coefficient (PTC) thermistor 136. A constant predetermined voltage $E_6$, which may be readily varied according to the desired functional requirements of the electrical circuit, is impressed across the second PTC thermistor 136 stabilizing the junction temperature of the thermistor 130 in a predetermined critical operating temperature range. Normal variations in the power source 132 will now have no detrimental effect on the operating current through the electrical load 134 which will remain essentially constant.

In a like manner, the impressed voltage $E_6$ to thermistor 136 may be varied, thereby causing a corresponding variance in the induced self-heating of the thermistor 130 and a corresponding change in the resistance of the thermistor 130. The variations in resistance of the thermistor 130 results in a corresponding variation in current flowing through the electrical load 134 and is therefore another means of maintaining a constant voltage drop across the electrical load 134. To achieve this, however, the power dissipated in the thermistor 130 must be substantially less than the power dissipated in the thermistor 136.

Figure 7:
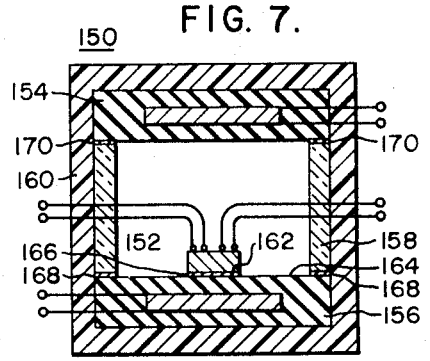
FIG. 7 is a cross-sectional view of a temperature controlled solid state single pole-single throw switch made in accordance with the teachings of this invention.

With reference to FIG. 7 there is shown temperature controlled electronic device 150 which is a modification of the device 40 shown in FIG. 3. The device 150 may comprise, for example, a solid state single pole-single throw switch 152, a first Positive Temperature Coefficient (PTC) thermistor 154 and a second PTC thermistor 156, each thermistor 154 and 156 being available commercially and comprising barium titanate, yttrium, strontium, zirconium and lead, a short length of tubing 158 of a suitable material such as glass, and a jacket 160 of thermal insulation, such for example as polyurethane foam. The switch 152 has a bottom surface 162 and the thermistor 156 has a top surface 164.

The switch 152 is maintained in a close thermal energy transfer relationship with the thermistor 156 by a layer 166 of bonding material disposed between the bottom surface 162 of the switch 152 and the top surface 164 of the thermistor 156. The layer 166 is a material that is electrically non-conducting and has a thermal resistance much less than the thermal resistance of the surrounding ambient.

The suitable bonding materials are either electrically insulating varnishes, such as diphenyl oxide polymers, electrically non-conducting epoxy resins containing no filler materials or solders suitable for joining together electronic components.

The short length of tubing 158 is joined to the top surface 164 of the thermistor 156 by a layer 168 of suitable bonding material. The thermistor 154, being of the same Positive Temperature Coefficient material and having the same physical characteristics as the thermistor 156, is affixed to the other end of the tubing 158 by a layer 170 of suitable bonding material. The bonding material comprising the layers 168 and 170 may be the same material as the layer 166.

The jacket 160 encapsulates all the components and all electrical leads are brought to the outside of the device 150.

Figure 8:
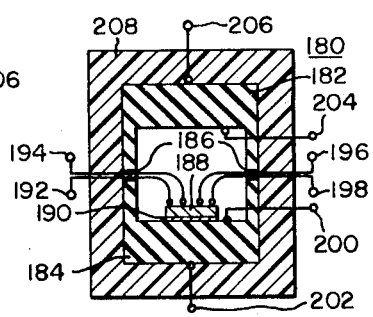
FIG. 8 is a cross-sectional view of a modification of the temperature controlled solid state single pole-single throw switch shown in FIG. 7.

With reference to FIG. 8, there is shown a temperature controlled electronic device 180 which is a modification of the device 150 shown in FIG. 7. The commercially available Positive Temperature Coefficient thermistors 154 and 156 along with the tubing 158 have been replaced by two cup-shaped members 182 and 184 comprising Positive Temperature Coefficient thermistor material. The two members 182 and 184 are joined together by a layer 186 of suitable bonding material, such for example, as an electrically insulating epoxy resin, to form an artificial environmental oven.

The device 180 comprises a solid state single pole-single throw switch 188 in a close thermal energy transfer relationship with the member 184 by a layer 190 of suitable bonding material and enclosed within the oven formed by the two members 182 and 184. Electrical leads 192, 194, 196 and 198 of the switch 188 are brought out through notches in the side walls of the members 182 and 184 and encapsulated within the layer 186 of bonding material. These leads 192, 194, 196 and 198, as well as electrical leads 200, 202 and 204 and 206 of the respective members 182 and 184 of PTC thermistor material, are then brought outside of a jacket 208 of insulating material which encapsulates the entire device 180.

Figure 9:
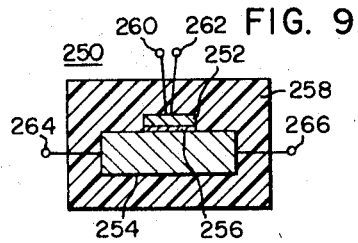
FIG. 9 is a cross-sectional view of a temperature controlled electronic device made in accordance with the teachings of this invention.

With reference to FIG. 9 there is shown a temperature controlled electronic device 250 which is a modification of the device 10 shown in FIGS. 1 and 2.

The device 250 comprises an electronic component 252, such, for example, as a semiconductor diode, retained in a close thermal energy transfer relationship with a Positive Temperature Coefficient thermistor 254 by a layer 256 of suitable bonding material disposed between the component 252 and the thermistor 254. A jacket 258 of suitable insulating material encapsulates the device 250 and electrical leads 260 and 266 of the component 252 and the thermistor 254 respectively are brought to the outside of the device 250.

The thermistor 254 does not have a protective coating. The thermistor 254 may be specifically made to any physical characteristics or shape requirement by the using person. Therefore it may be desirable to form the thermistor into a cup-shaped member and set the component 252 into the cup portion.

Figure 10:
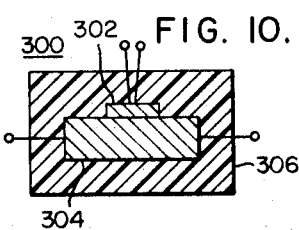
FIG. 10 is a cross-sectional view of a modification of the temperature controlled electronic device shown in FIG. 9.

With reference to FIG. 10 there is shown a controlled temperature electronic device 300 which is a modification of the device 250.

The device 300 comprises an electronic component 302 such, for example, as a semiconductor diode, retained in a close thermal energy transfer relatively with a Positive Temperature Coefficient thermistor 304 by compressional force means only. A jacket 306 of suitable insulating material encapsulates the device 300, the material of the jacket 306 supplying the necessary compressional force to maintain the close thermal energy transfer relationship between the component 302 and the thermistor 204.

EXAMPLE I

A temperature controlled electronic component, such, for example, as shown in FIG. 3 and embodying the teachings of this invention, was fabricated and functionally tested.

The semiconductor device was a transistor which was bonded to a Positive Temperature Coefficient thermistor comprising the reaction product of barium titanate, yttrium, strontium, zirconium and lead, by an electrically non-conducting epoxy resin containing no filler materials therein. The transistor and the Positive Temperature Coefficient thermistor were then centrally disposed within an environmental chamber containing vermiculite and their respective electrical leads brought to the outside.

The environmental chamber comprised a short length of copper tubing disposed between, and having each end of the tubing affixed to, two Positive Temperature Coefficient thermistors. Electrically non-conducting epoxy resin containing no filler material was employed for affixing the tubing to the thermistors.

The material of the Positive Temperature Coefficient thermistors in the environmental chamber comprised the reaction product of barium titanate, strontium and tin.

A jacket of polyurethane foam insulation was placed about all the assembled components and all the electrical leads were brought to the outside of the device in order to complete the necessary electrical test connections.

Table I is a tabulation of the results obtained from functionally testing the completed device. $T_1$ is the ambient temperature reading of the controlled temperature electronic device. $T_2$ is the temperature reading taken within the environmental chamber. $T_3$ was the junction temperature of the transistor. $T_2$ and $T_3$ were simultaneously recorded at the same time that a reading was taken at $T_1$. $\Delta T$ is the temperature variation which occurred in each of the three temperature regions measured during the testing of the device.

TABLE I

| Parameter | Description | Limits (° C.) | ΔT (° C.) |
|---|---|---|---|
| $T_1$ | Ambient | −40−+80 | 120 |
| $T_2$ | Chamber | −60−+105 | 45 |
| $T_3$ | Transistor | +121−+125.5 | 4.5 |

The results show that this type of temperature controlled electronic device resulted in a 26 fold reduction in temperature variation when the ambient temperature was cycled from −40° C. to +80° C.

While the invention has been described with reference to particular embodiments and example, it will be understood, of course, that mdoifications, substitutions and the like may be made therein without departing from the scope.

Therefore, what is claimed as new is:

1. A temperature controlled electronic device comprising (1) a body of semiconductor material, said body of semiconductor material having at least two regions of opposite type semiconductivity and at least one p-n junction contained therein, (2) a body of Positive Temperature Coefficient thermistor material, said body of Positive Temperature Coefficient thermistor material being in a close thermal energy transfer relationship with said body of semiconductor material, (3) a jacket of insulating material, said jacket encapsulating said bodies of semiconductor material and Positive Temperature Coefficient thermistor material and (4) means for connecting said body of semiconductor material and said body of Positive Temperature Coefficient thermistor material into electrical circuits.

2. A temperature controlled electronic device comprising (1) a body of semiconductor material, said body of semiconductor material having at least two regions of opposite type semiconductivity and at least one p-n junction contained therein, (2) a body of Positive Temperature Coefficient thermistor material, said body of Positive Temperature Coefficient thermistor material being in a close thermal energy transfer relationship with said body of semiconductor material, (3) a layer of bonding material, said layer being disposed between said body of semiconductor material and said body of Positive Temperature Coefficient thermistor material, said layer being a bonding material selected from the group of bonding materials consisting of electrically non-conducting epoxy resins, electrically insulating varnishes and electronic solders, (4) a jacket of insulating material, said jacket encapsulating said bodies of semiconductor material and Positive Temperature Coefficient thermistor material, and (5) means of providing electrical circuitry connections to said bodies of semiconductor material and Positive Temperature Coefficient thermistor material.

3. A temperature controlled electronic device, said device comprising (1) a body of semiconductor material, said body of semiconductor material having at least two regions of opposite type semiconductivity and at least one p-n junction contained therein, (2) a body of Positive Temperature Coefficient thermistor material, said body of Positive Temperature Coefficient thermistor material being in a close thermal energy transfer relationship with said body of semiconductor material, said close thermal energy transfer relationship being achieved by mechanical means, (3) a jacket of insulating material, said jacket encapsulating said bodies of semiconductor material and Positive Temperature Coefficient Material, and (4) means of providing electrical circuitry connections to said bodies of semiconductor material and Positive Temperature Coefficient material.

4. A temperature controlled electronic device, said device comprising (1) a body of semiconductor material, said body of semiconductor material having at least two regions of opposite type semiconductivity and at least one p-n junction contained therein, (2) a body of Positive Temperature Coefficient thermistor material, said body of Positive Temperature Coefficient thermistor material being in a close thermal energy transfer relationship with said body of semiconductor material, (3) a jacket of insulating material, said jacket encapsulating said bodies of semiconductor material and said Positive Temperature Coefficient thermistor material, said jacket being a material selected from the group consisting of polyurethane foam, still air, vermiculite, glass wool and foamed epoxy resins, and (4) means of providing electrical circuitry connections to said bodies of semiconductor material and Positive Temperature Coefficient thermistor material.

5. A temperature controlled electronic device comprising (1) a temperature controlled environmental chamber, said chamber comprising a first body of Positive Temperature Coefficient thermistor material, a second body of Positive Temperature Coefficient thermistor material and a hollow spacer, said spacer being disposed between, and joined to, said first and said second bodies of Positive Temperature Coefficient thermistor material, (2) an electronic component, said component being disposed within said temperature controlled environmental chamber, said component being in a close thermal energy transfer relationship with at least one of said first and said second bodies of Positive Temperature Coefficient thermistor material, (3) a jacket of insulating material, said jacket encapsulating said temperature controlled environmental chamber, and (4) means of providing electrical circuitry connections to said bodies of Positive Temperature Coefficient thermistor material and said electronic component.

6. The temperature controlled electronic device of claim 5 in which the electronic component is a solid state single pole-single throw switch.

7. A temperature controlled electronic device comprising (1) a temperature controlled environmental chamber, said chamber comprising a first body of Positive Temperature Coefficient thermistor material, a second body of Positive Temperature Coefficient thermistor material and a hollow spacer, said spacer being made of a material selected from the group consisting of glass, copper aluminum, base alloys of copper and aluminum and barium titanate, yttrium, strontium, zirconium, tin, lead and admixtures and compounds thereof, said spacer being disposed between, and joined to, said first and said second bodies of Positive Temperature Coefficient thermistor material, (2) an electronic component, said component being disposed within said temperature controlled environmental chamber, said component being in a close thermal energy transfer relationship with at least one of said first and said second bodies of Positive Temperature Coefficient thermistor material, (3) a jacnet of insulating material, said jacket encapsulating said temperature controlled environmental chamber, and (4) means of providing electrical circuitry connections to said bodies of Positive Temperature Coefficient thermistor material and said electronic component.

8. A temperature controlled electronic device comprising (1) at least one temperature controlled environmental chamber, said chamber comprising a first member of Positive Temperature Coefficient thermistor material and a second body of Positive Temperature Coefficient thermistor material, said first and said second members of Positive Temperature Coefficient thermistor material each containing at least one cup-shaped depression, said first and said second members being joined together to form said chamber, (2) at least one electronic component, each of said components being disposed in one of said temperature controlled environmental chambers, each of said components being in a close thermal energy transfer relationship with one of said first and said second members of Positive Temperature Coefficient thermistor material, (3) a jacket of insulating material, said jacket encapsulating said temperature controlled environmental chamber, and (4) means of providing electrical circuitry connections to said first and said second members of Positive Temperature Coefficient thermistor material and each of said electronic components.

9. A temperature controlled electronic device comprising (1) a temperature controlled environmental chamber, said chamber comprising a first body of Positive Temperature Coefficient thermistor material, a second body of Positive Temperature Coefficient thermistor material and a hollow spacer, said spacer being disposed between and joined to, said first and said second bodies of Positive Temperature Coefficient thermistor material, (2) a third body of Positive Temperature Coefficient thermistor material, (3) an electronic component, said component being in a close thermal energy transfer relationship with said third body of Positive Temperature Coefficient thermistor material, said component and said third body of Positive Temperature Coefficient thermistor material being disposed within said temperature controlled environmental chamber and in a close thermal energy transfer relationship with at least one of said first and said second bodies of Positive Temperature Coefficient thermistor material, (4) a jacket of insulating material, said jacket encapsulating said temperature controlled environmental chamber, and (5) means of providing electrical circuitry connections to said first, said second and said third bodies of Positive Temperature Coefficient thermistor material and said electronic component.

10. A temperature controlled electronic device comprising (1) a first body of Positive Temperature Coefficient thermistor material, (2) a second body of Positive Temperature Coefficient thermistor material in an electrical series circuit relationship with an electrical device, said second body of Positive Temperature Coefficient thermistor material being in a close thermal energy transfer relationship with said first body, and (3) means of providing electrical circuitry connections to said first body of Positive Temperature Coefficient thermistor material and said second body of Positive Temperature Coefficient thermistor material.

11. A variable voltage controlled attenuator, said attenuator comprising (1) a first Positive Temperature Coefficient thermistor, (2) a Negative Temperature Coefficient thermistor, (3) a second Positive Temperature Coefficient thermistor, said second Positive Temperature Coefficient thermistor being disposed between, and in a close thermal energy transfer relationship with, said first Positive Temperature Coefficient thermistor and said negative temperature, and (4) means of providing electrical circuitry perature Coefficient thermistors and said Negative Temperature Coefficient thermistors and said negative Temperature Coefficient thermistor.

References Cited

UNITED STATES PATENTS

| | | | |
|---|---|---|---|
| 2,915,724 | 12/1959 | Fritts | 317—235 X |
| 2,930,904 | 3/1960 | Fritts | 317—234 X |
| 3,028,473 | 4/1962 | Dyer et al. | 317—235 |
| 3,182,201 | 5/1965 | Sklar | 307—88.5 |
| 3,199,001 | 8/1965 | Dyben | 317—234 |
| 3,269,174 | 9/1966 | Linville | 338—23 X |
| 3,286,138 | 11/1966 | Shockley | 317—235 |
| 3,293,540 | 12/1966 | Silard et al. | 317—235 |
| 3,358,152 | 12/1967 | Alexakis | 317—235 |

JOHN W. HUCKERT, *Primary Examiner.*

R. F. POLISSACK, *Assistant Examiner.*

U.S. Cl. X.R.

317—234, 41; 338—22, 23, 25; 219—209, 210, 510